United States Patent [19]
Kurita

[11] Patent Number: 6,043,455
[45] Date of Patent: Mar. 28, 2000

[54] FLOOR HEATING SYSTEM AND FLOOR-HEATING DEVICE AND HOLLOW CONNECTING MEMBER

[75] Inventor: Yasuo Kurita, Aichi, Japan

[73] Assignee: Kurita Kogyo Co., Ltd., Japan

[21] Appl. No.: 08/650,521

[22] Filed: May 20, 1996

[30] Foreign Application Priority Data

May 19, 1995 [JP] Japan ..................................... 7-121449
Feb. 15, 1996 [JP] Japan ..................................... 8-28050

[51] Int. Cl.⁷ .............................. H05B 1/00; F24H 19/02
[52] U.S. Cl. .............................................. 219/213; 165/56
[58] Field of Search ........................... 219/213; 392/485, 392/486, 488, 489, 496; 237/69; 165/49, 50, 53, 56

[56] References Cited

U.S. PATENT DOCUMENTS

| | | | |
|---|---|---|---|
| 1,905,343 | 4/1933 | Carpenter | 392/488 |
| 1,985,830 | 12/1934 | Hynes | 392/485 |
| 2,597,744 | 5/1952 | Morrison | 392/488 |
| 2,859,015 | 11/1958 | Spangler | 392/489 |
| 2,877,630 | 3/1959 | Schultz | 392/489 |
| 4,436,983 | 3/1984 | Solobay | 392/488 |
| 4,907,739 | 3/1990 | Drake | 237/69 |
| 5,371,830 | 12/1994 | Wachenheim | 392/489 |
| 5,396,574 | 3/1995 | Base et al. | 392/489 |

FOREIGN PATENT DOCUMENTS

| | | | |
|---|---|---|---|
| 994870 | 11/1951 | France | 392/489 |
| 462930 | 3/1937 | United Kingdom | 392/489 |

*Primary Examiner*—Sang Paik
*Attorney, Agent, or Firm*—Morrison Law Firm

[57] ABSTRACT

System and device for heating a floor includes an inner pipe disposed in an outer pipe, the space between the inner and outer pipes can be filled with water or a thermal medium fluid. A heated fluid or an electric heater inside the inner pipe transfers heat through the inner pipe to the water or thermal medium fluid. With the inner and outer pipes oriented in the vertical, the heat in the water or thermal medium fluid can by convection pass up to a top of these pipes which top being placed just below the floor passes heat to the floor.

2 Claims, 15 Drawing Sheets

(a)

(b)

FLOOR HEATING SYSTEM AND FLOOR-HEATING DEVICE AND HOLLOW CONNECTING MEMBER

BACKGROUND OF THE INVENTION

The present invention relates to a floor heating system that heats from beneath a floor. The present invention also relates to a floor heating device that implements this floor heating system. Furthermore, the present invention also relates to a member to be used in the floor heating device.

In past floor heating systems, a heated thermal medium fluid is circulated through long, thin seamless pipes disposed beneath a floor. The heat emitted from the thermal medium fluid heated the floor from below. It was also possible to have electricity go through long, thin electric heating wires disposed beneath a floor so that heat from the heating wires would be conducted to the floor.

Of the systems described above, the one involving circulation of the thermal medium fluid operates as follows. First, a circulation path for a thermal medium fluid is disposed beneath a floor, this path comprising seamless pipes made from a material having good heat conductivity, and buried panels for installing these seamless pipes beneath the floor. The thermal medium fluid in the seamless pipes is heated with a boiler disposed outside of the circulation path. A pump that provides circulation of the thermal medium fluid is disposed in the circulation path. In the system involving electric heating wires, continuous electric heating wires covered by insulation are disposed, and a concrete floor surface serves to fix the positions of the heating wires.

In the floor heating system involving the circulation of a thermal medium fluid, the temperature of the heated thermal medium fluid gradually decreases. Thus, the floor area above the first half of the circulation path (the region near the boiler) is heated to a high temperature. However, the floor area above the latter half of the circulation path (the region away from the boiler) is not heated as much. Thus, it is not possible to achieve adequate warming of the floor. In order to allow the heat from the thermal medium fluid to be discharged over the entire floor, arcs and bends can be made in the seamless pipes so that they form a wave shape. This makes the installation of seamless pipes time consuming.

In the floor heating system involving electric heating wires, the temperature of the heating wires does not rise very quickly. Thus, it is difficult to heat an area to a desired temperature. Also, obtaining enough heat from the heating wires to adequately heat an area consumes a large amount of electricity, resulting in very high running costs.

In the floor heating system involving the circulation of a thermal medium fluid, a pump is used to forcibly circulate the thermal medium fluid within the seamless pipes. This creates a burden on the boiler if the circulation path is long or if the thermal medium fluid is viscous. Thus, maintenance needs to be performed frequently on the boiler, and this could be expensive. The boiler is used to heat the thermal medium fluid generally by heating all the thermal medium fluid accumulated within the boiler. Thus, heating is also performed on thermal medium fluid that does not circulate, resulting in a lot of superfluous heating. The heat energy used in this heating is lost, as is heat generated by the thermal medium fluid as it goes from the boiler to the circulation path. These kinds of energy losses are not consistent with the current public concern for energy conservation.

In heating systems using electric heating wires, it is necessary to install heating wires in prescribed positions and then fix them with concrete. This can be done only in cases where concrete can be used in the floor. The process requires extensive construction work, which could be difficult in many homes.

OBJECTS AND SUMMARY OF THE INVENTION

The object of the present invention is to overcome the drawbacks of the prior art described above. A further object of the present invention is to provide a floor heating system that can be installed easily and that provides efficient heating. A further object of the present invention is to provide an economical floor heating device and a member for such a device.

The present invention relates to a floor heating system wherein: a double pipe structure comprising an outer pipe and an inner pipe is installed below a floor; in this double pipe structure, water or a thermal medium fluid is sealed between the outer pipe and the inner pipe; and a heat generating body is inserted within the inner pipe.

The present invention also relates to a floor heating device comprising: two main pipes disposed parallel to each other; outer pipes connecting to the sides of the two main pipes that face each other; inner pipes inserted within the outer pipes connecting to the sides of the two main pipes that do not face each other; and a heat generating body inserted within the inner pipes.

The present invention also relates to a floor heating system wherein: a plurality of double pipe structures comprising outer pipes and inner pipes is disposed in a parallel manner under a floor; in these double pipe structures, water or a thermal medium fluid is sealed between the outer pipes and the inner pipes; a heat generating body is inserted within the inner pipes; the inner pipes are projected from both ends of the double pipe structure to allow the heat generating body to be inserted within the inner pipes.

The present invention also relates to a hollow connecting member to be used in a floor heating device comprising: a plurality of outer pipes disposed parallel to each other under a floor; inner pipes disposed within these outer pipes; and electric heating wires inserted in the inner pipes. The hollow connecting member comprises: an outer pipe connecting portion that can simultaneously connect the ends of two adjacent outer pipes on the same side; and an inner pipe connecting portion that can connect an inner pipe along the axial direction of the outer pipe. The hollow connecting member has a hollow interior that connects the outer pipe and the inner pipe.

In a floor heating system according to the configuration described above, the inner pipe of the double pipe structure is heated by the heat generating body. The discharged heat heats the outside of the inner pipe and the water or thermal medium fluid sealed within the outer pipe. Heat loss is minimized since the heat from the heat generating body acts to increase the temperature of the water or thermal medium fluid. Since the water or the thermal medium fluid has a high specific heat, the heat results in a gradual increase of temperature. Once the temperature is increased, it does not drop down easily, so that the entire outer pipe can be kept at a high temperature. Inside the outer pipe, convection currents act on the water or the thermal medium fluid sealed in the outer pipe. Fluid with high temperatures rise in the pipe, while fluid with low temperatures descend downward. The high-temperature water or thermal medium fluid heats the floor from the upper surface of the outer pipe, thus concentrating the heat at the floor.

In the floor heating device, since a thermal medium fluid or the like is not circulated, no boiler or pump is needed, thus making maintenance simple. Even if an electric heating wire is used as a heat generating body, the heat is not directly discharged from the heating wire to heat the floor. Instead, the heating wire is used to heat the water or thermal medium fluid, and the heating of the floor is performed by raising the temperature of the water or the thermal medium fluid. Thus, only enough heat to raise the temperature of the water of the thermal medium fluid is needed, so that it is not necessary to provide enough heat to heat the entire floor. In other words, the floor cannot be heated while the water or the thermal medium fluid is being heated, so the initial start-up time is slow, but once the temperature of the water or thermal medium fluid is raised, heating can be performed efficiently.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
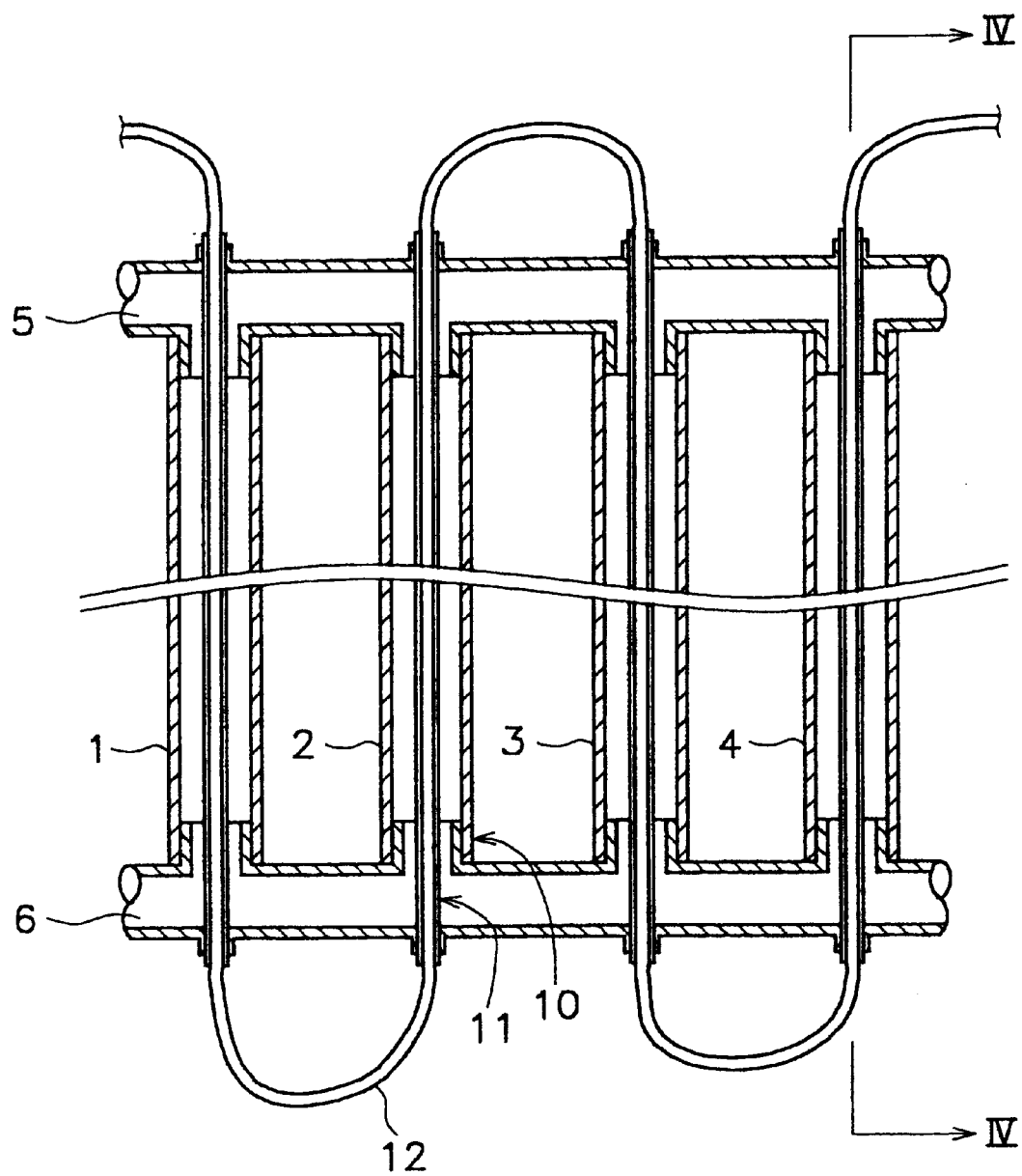
FIG. 1 is a drawing for the purpose of describing an embodiment of the floor heating system of the present invention.
Figure 2:
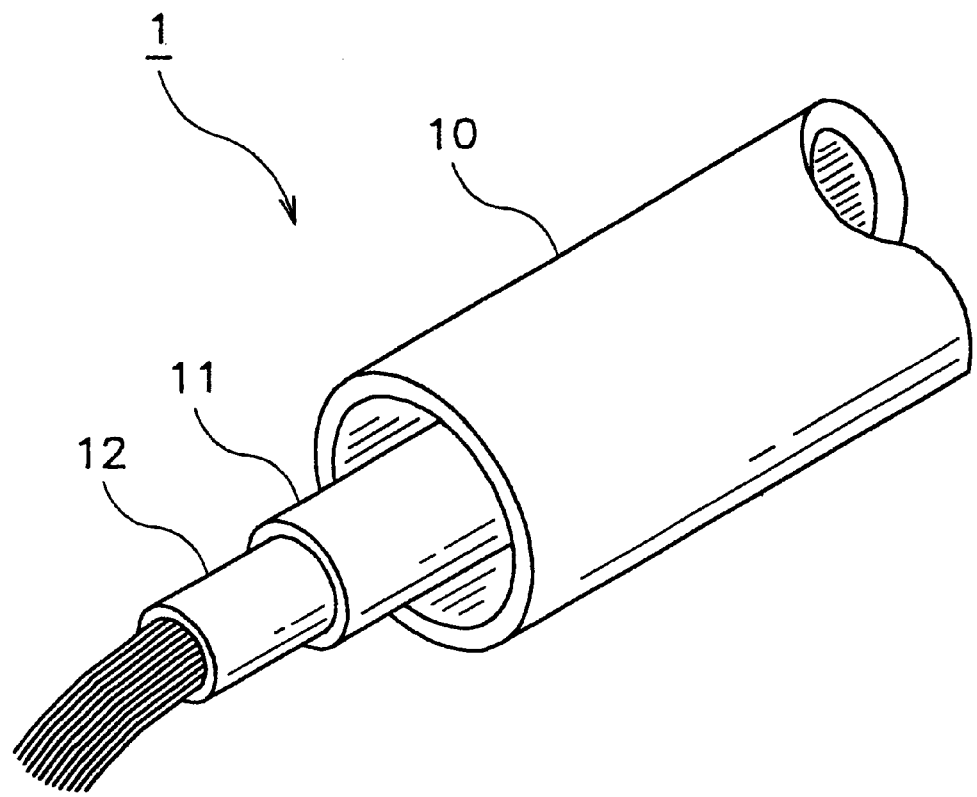
FIGS. 2a and 2b are respective perspective and transverse schematic views for the purpose of describing the structure of the double pipe structure.
Figure 2:
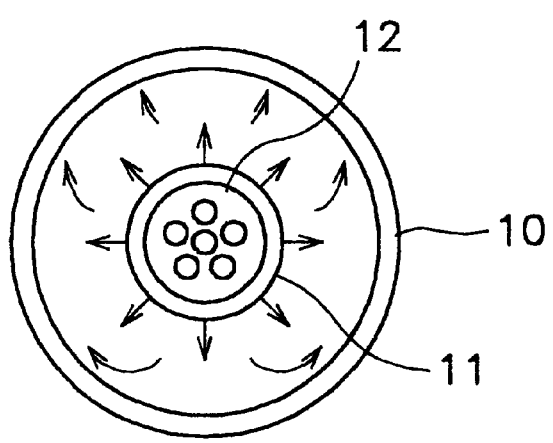

Referring to the drawings, the following is a description of the embodiments of the floor heating system of the present invention. Referring to FIG. 1, in this embodiment a plurality of double pipe structures 1, 2, 3, 4 are disposed in the area for which the floor is to be heated. The ends of these pipes are connected to main pipes 5, 6, so that when main pipes 5, 6 are filled with water, double pipe structures 1, 2, 3, 4 are also filled with water. Main pipes 5, 6 are disposed parallel to each other, and double pipe structures 1, 2, 3, 4 are disposed between them. Referring to FIG. 2(a), in each of double pipe structures 1, 2, 3, 4, an inner pipe 11 is inserted within an outer pipe 10 so that there is a space between the two. An electric heating wire 12 is inserted snugly into inner pipe 11. Thus, when electric heating wire 12 gives off heat, heat is discharged so that it diffuses radially from the axis of electric heating wire 12. This heat cannot escape anywhere and is transferred to inner pipe 11. As described above, outer pipe 10 is filled with water, i.e. the hollow space between outer pipe 10 and inner pipe 11 is filled with water. The heat transferred to inner pipe 11 heats the water. Convection currents act on this heated water within outer pipe 2. Heated water rises up and cooled water falls downward. Referring to FIG. 2(b), the water heated in the vicinity of inner pipe 1 moves upward from inner pipe 11 (in the direction indicated by the arrow in the drawing), and then descends downward after its heat is dissipated at the upper part of outer pipe 10. Since heated water is always present at the upper part of outer pipe 10, the floor boards that are in contact with the upper part of outer pipe 10 are heated efficiently.

Figure 3:
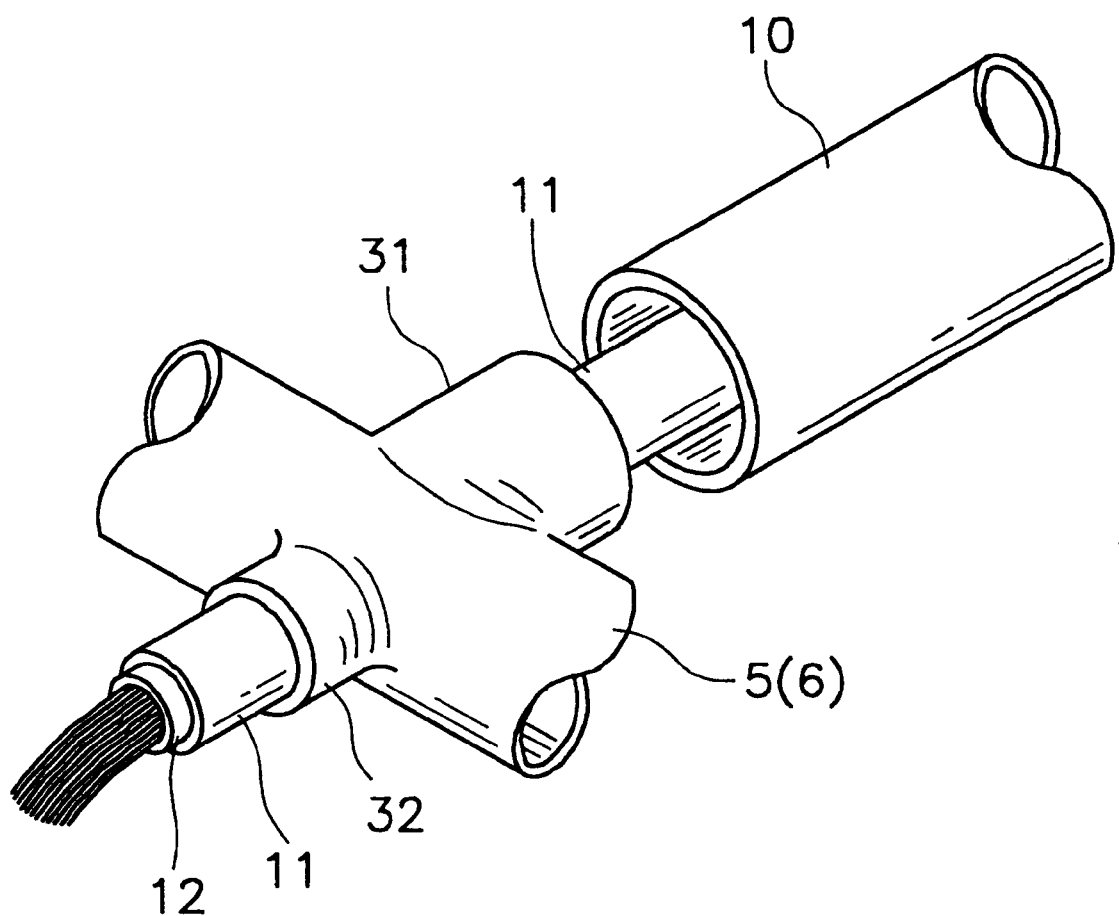
FIG. 3 is a drawing for the purpose of describing the connection between the main pipe and the outer pipe and the inner pipe.
Figure 4:
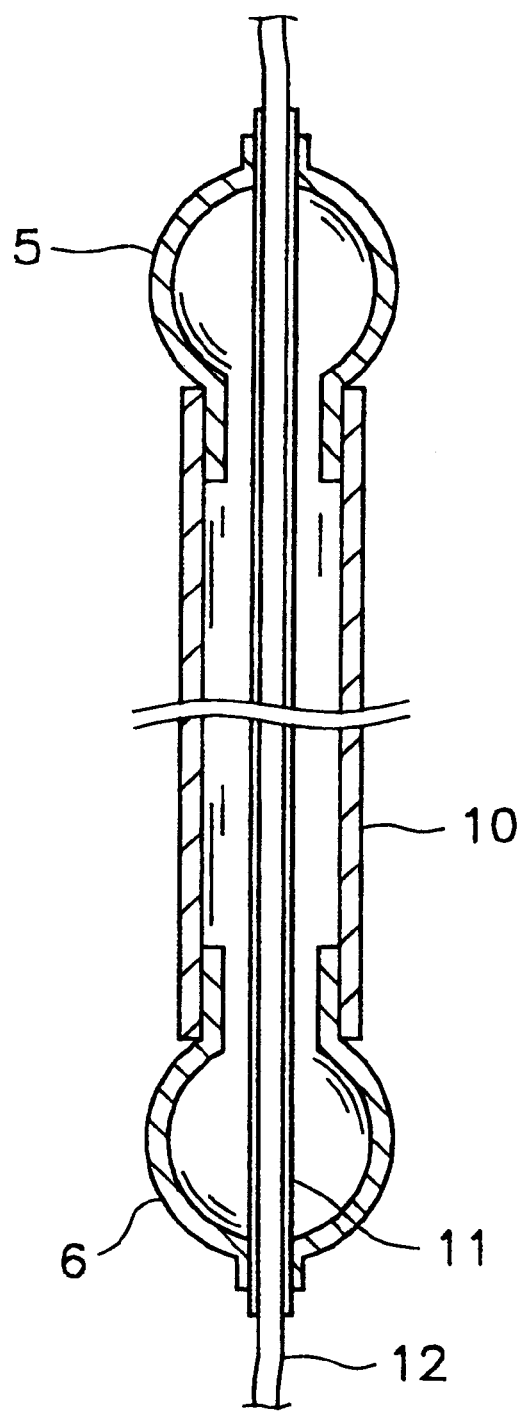
FIG. 4 is a cross-section drawing along the IV—IV line of FIG. 1.

The following is a description of the floor heating device of this embodiment. First, the structures of double pipe structures 1, 2, 3, 4 and main pipes 5, 6 will be described, as long as the connections between them. Referring to FIG. 3, an outer pipe connecting portion 31 and an inner pipe connecting portion 32 are projected from main pipe 5 (6) in opposing directions from the axial line of main pipe 5 (6). The bond between outer pipe connecting portion 31 can be made by using an adhesive at the inside of outer pipe 10 and the outside of outer pipe connecting portion 31. Using an adhesive between inner pipe connecting portion 32 and inner pipe 11 is difficult because inner pipe 11 is inserted after outer pipe 10 is connected. Therefore, the bond is made by welding at an appropriate position. Since electric heating wire 12 inserted inside inner pipe 11 does not need to be connected, electric heating wire 12 is freely movable within inner pipe 11. Referring to FIG. 4, by connecting outer pipe 10 and inner pipe 11 and main pipes 5, 6 in the manner described, outer pipe 10 is connected between main pipes 5, 6 and inner pipe 11 is inserted into outer pipe 10 coaxially with a space between the two pipes. Main pipes 5, 6 are connected to outer pipe 10 so that the axial lines are perpendicular. Thus, the ends of inner pipe 11 are opened outside of main pipes 5, 6, and the hollow portion of inner pipe 11 is continuous with outer pipe 10 and the space outside of main pipes 5, 6. Referring to FIG. 1, the space for electric heating wire 12 to pass through double pipe structures 1, 2, 3, 4 can be made continuous with the exposed area outside, thus making it possible to install a single electric heating wire in a wave pattern.

Figure 5:
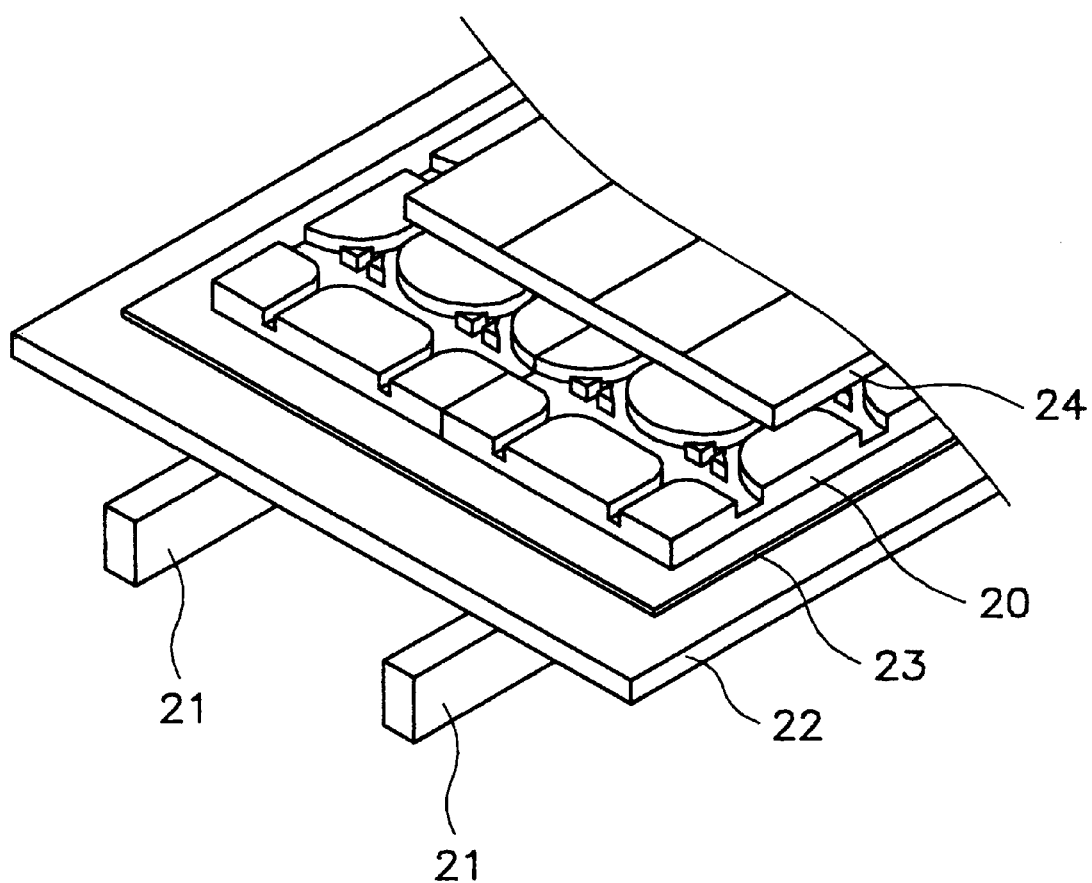
FIG. 5 is a schematic perspective drawing of the structure under a floor.

Referring to FIG. 5, the following is a summary description of the structure beneath the floor in a floor heating arrangement. Floor boards 22 are disposed on joists 21. An insulating sheet 23 is used to cover the floor boards, and buried panels 20 are installed. Seamless pipes are embedded in the buried panels 20. Finish flooring 24 is then attached on top of this. Buried panels 20 are arranged directly below finish flooring 24 so that there are no gaps, and so that the grooves formed on buried panels 20 are continuous. The finish flooring 24 on the surface is nailed down. As described above, buried panels 20 comprises a foam resin having a low foaming rate. Since this material is relatively hard, it can hold nails. Of course, the nails are to be nailed in at points where there are no grooves on buried panel 20. It is also possible to separately arrange thinner joists on floor boards 22 between buried panels 20, so that when nails are to be nailed in, the nails are nailed in to the joists.

Figure 6:
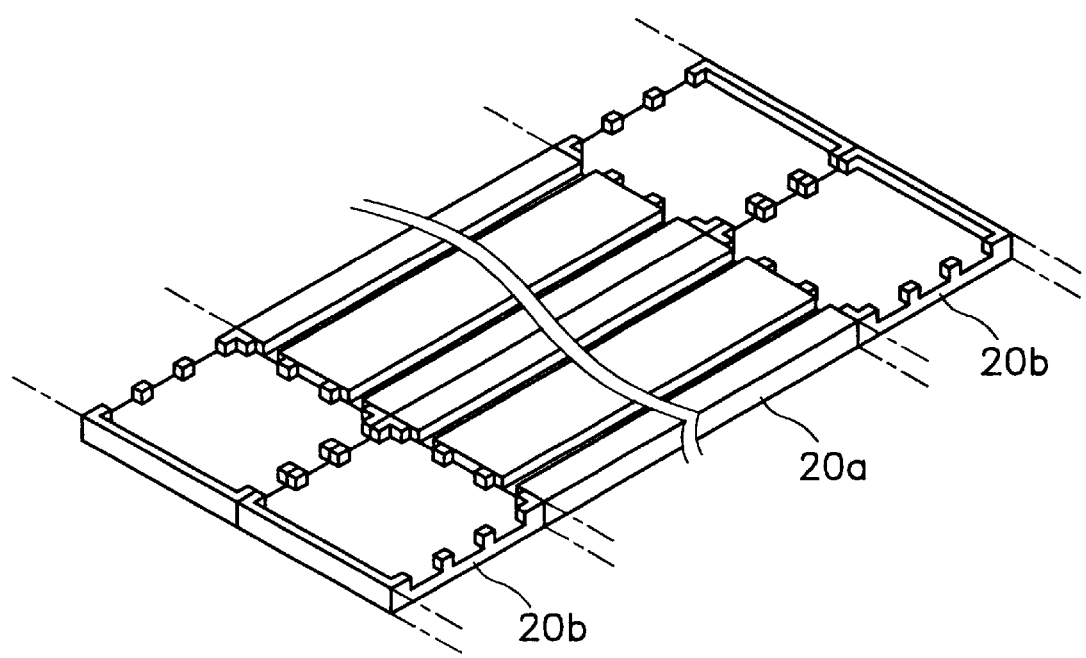
FIG. 6 is a perspective drawing of the embedding panel.
Figure 7:
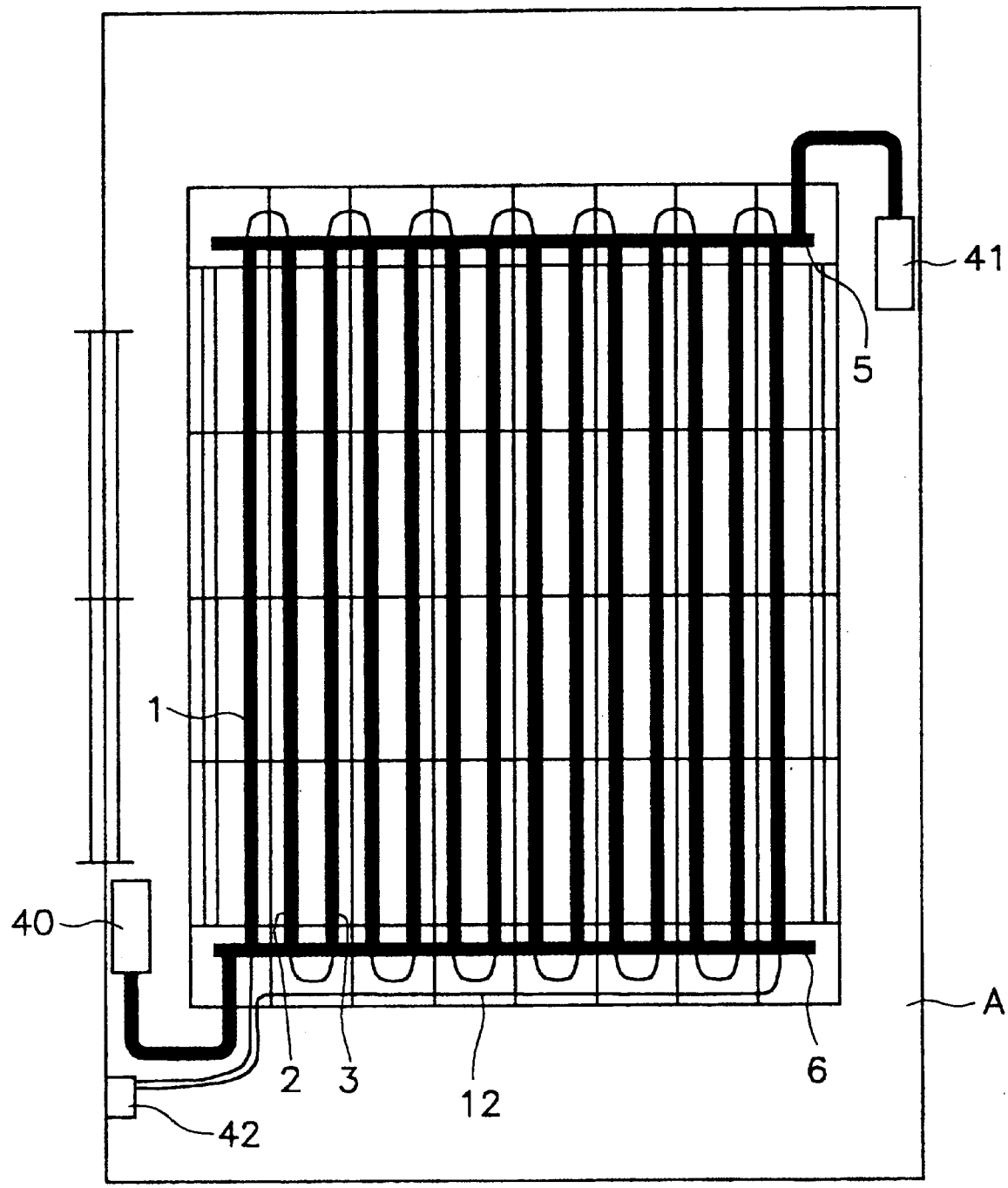
FIG. 7 is a drawing for the purpose of describing the entire room system.

In these kinds of under-floor structures, this embodiment uses buried panels 20 as shown in FIG. 6. Buried panels 20 comprise an outer pipe embedding panel 20a and a main pipe embedding panel 20b. Perfectly linear grooves are formed on outer pipe embedding panels 20a so that double pipe structures 1, 2, . . . (FIG. 1) can be installed. Main pipe embedding panels 20b are formed to allow installation of electric heating wire 12 (FIG. 11), which connects to main pipes 5, 6 (FIG. 1). By forming buried panels 20a, 20b out of metallic material, it is possible to transfer the heat discharged from outer pipe 10 (FIG. 2) to finish flooring 24 (FIG. 5). By using outer pipe embedding panels 20a and main pipe embedding panels 20b as described above, it is possible to install double pipe structures 1, 2, . . . , main pipes 5, 6 and a continuous electric heating wire 12 in desired positions. A supply tank 40 and an exhaust valve 41 are connected to double pipe structure 1, 2, . . . and main pipes 5, 6, installed in a room A. When water is to be sealed in outer pipe 10 of double pipe structures 1, 2, . . . , the water needed can be supplied from supply tank 40. During periods when no heating is necessary, water can be let out via exhaust valve 41. Electric heating wire 12 is connected to a power supply 42, which supplies power to the wire. The power supply can be turned off and on by using a switch not shown in the drawings. By adjusting the amount of electricity with a controller not shown in the drawings, the heating temperature can be adjusted. This adjustment can also be performed using a control device that operates based on a temperature sensor.

Figure 8:
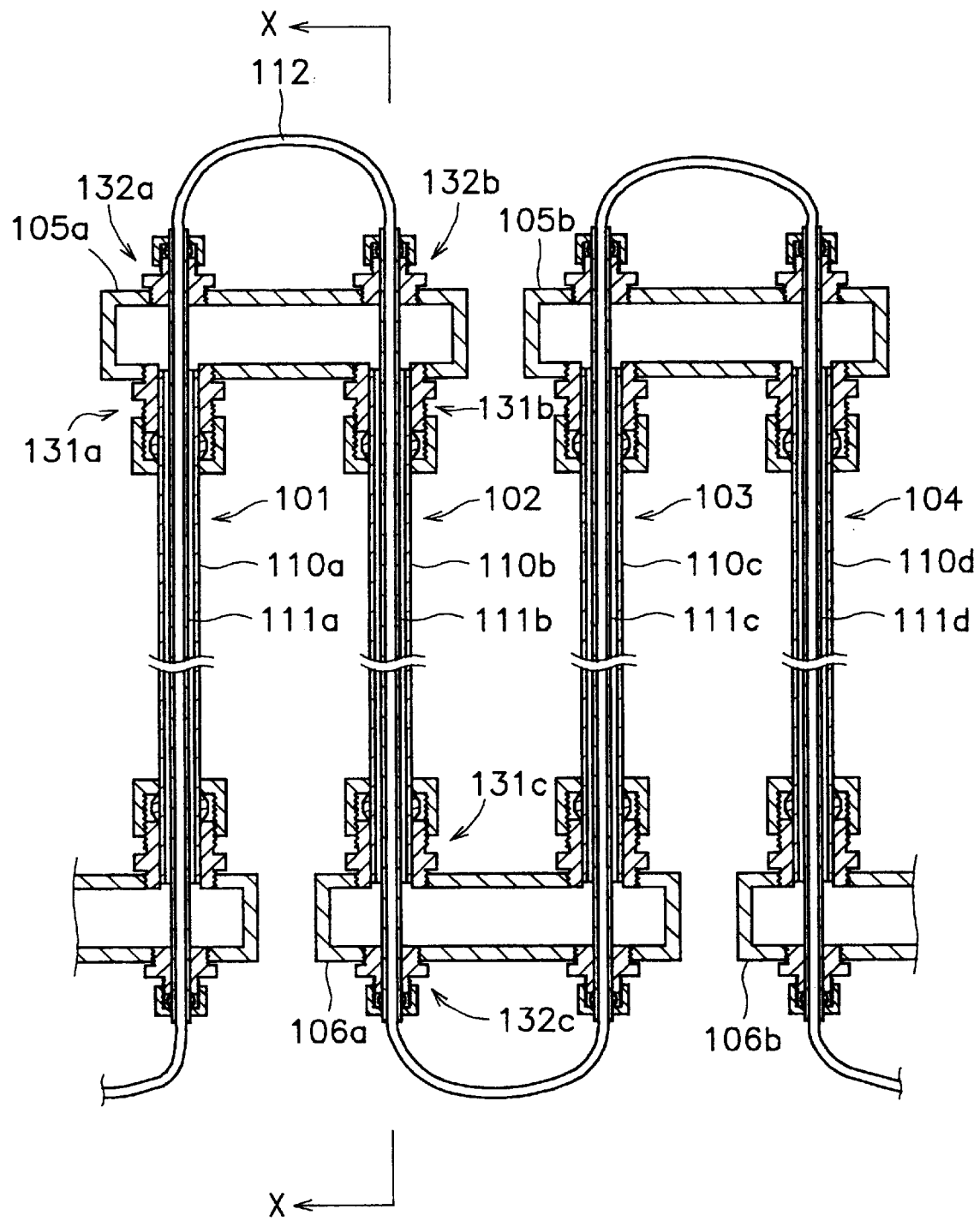
FIG. 8 is a drawing for the purpose of describing a second embodiment of the floor heating system of the present invention.

The following is a description of a second embodiment of the floor heating system of the present invention. Referring to FIG. 8, in this embodiment a plurality of double pipe structures 101, 102, 103, 104, . . . are disposed parallel to one another. Double pipe structures 101, 102, 103, 104, . . . comprise outer pipes 110a, 110b, 110c, 110d, . . . and inner pipes 111a, 111b, 111c, 111d, . . . respectively. There is a space between the outer pipes and the inner pipes, and only inner pipes 111a, 111b, 111c, 111d, . . . project from the ends of double pipe structures 101, 102, 103, 104, . . . A hollow connecting member 105a connects one end (top of the drawing) of double pipe structure 101 in the first row to one end (top of the drawing) of double pipe structure 102 in the second row. Connecting member 105a makes the space between outer pipe 110a and inner pipe 111a in the first row continuous with the space between outer pipe 110b and inner pipe 111b in the second row. Hollow connecting member 105a comprises a polygonal column shaped body with a hollow cavity. A large-diameter connecting portion 131a is formed on one end to connect to outer pipe 110a, and on the opposite end is disposed a small-diameter connecting portion 132a to connect to inner pipe 111a. Since inner pipe 111a is formed longer than outer pipe 110a, one end of outer pipe 110a (top of the drawing) is connected to one end of hollow connecting member 105a, and inner pipe 111a passes through outer pipe 110a as well as the cavity in hollow connecting member 105a and connects to the other end of hollow connecting member 105a. One end (top of the drawing) of double pipe structure 102 in the second row connects to hollow connecting member 105a in a similar manner. Thus, outer pipes 110a, 110b in the first and second rows open into the hollow cavity in hollow connecting member 105a. Inner pipes 111a, 111b pass through the hollow cavity in hollow connecting member 105a and open to the outside. Thus the space between the two is kept sealed and is made continuous by the hollow cavity in hollow connecting member 105a. Similarly, a hollow connecting member 106a connects double pipe structure 102 in the second row and the other end (bottom of the drawing) of double pipe structure 103 in the third row. Furthermore, hollow connecting member 105b connects double pipe structure 103 in the third row and the other end (top of the drawing) of double pipe structure 104 in the fourth row. This is repeated so that connections are made to the final row, and the space between the outer pipes 110a, 110b, . . . and inner pipes 111a, 111b, . . . of double pipe structures 101, 102, . . . form a roughly wave shape that is continuous throughout. By pouring water (or possibly a thermal medium fluid) into one portion of this space, it is possible to fill each space with water (or thermal medium fluid) and to seal this water (or thermal medium fluid) in the space. Since water (or thermal medium fluid) flows only in one direction in each of these spaces, water (or thermal medium fluid) can be sealed without any air being left inside. Electric heating wire 112 can be passed through without having any water (or thermal medium fluid) infiltrate into inner pipes 111a, 111b, . . . of double pipe structures 101, 102, . . . A continuous electric heating wire 112 can be installed in a roughly wave shape that matches the wave space described above.

Figure 9:
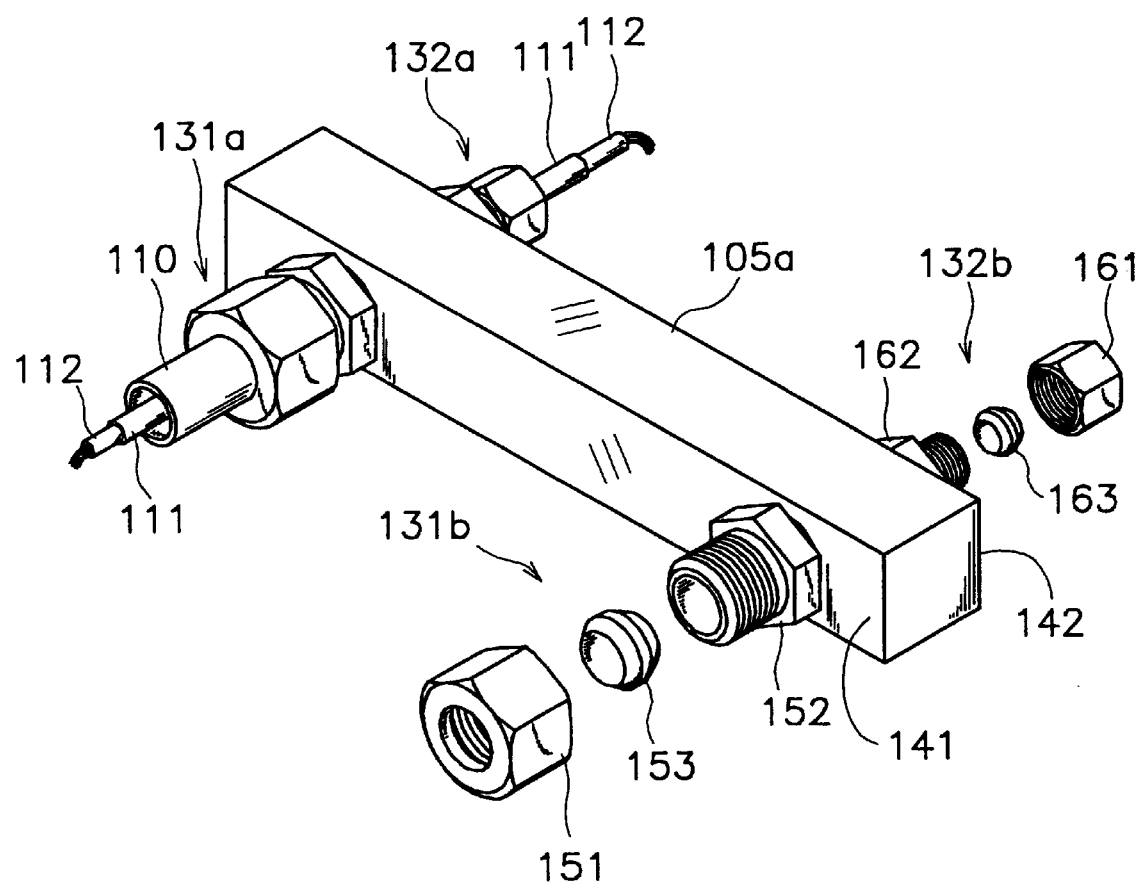
FIG. 9 is a drawing for the purpose of describing the hollow connecting member.

The following is a description of the member used in the floor heating device. This member is the hollow connecting member 105a, 105b, 106a, 106b, . . . described above and is used to connect the ends of double pipe structures 101, 102, . . . Referring to FIG. 9, hollow connecting member 105a comprises a thin shaft-shaped main unit. On two points on a side 141 are disposed outer pipe connecting portions 131a, 131b, which connect to outer pipe 110. On two points on an opposite side 142 are disposed inner pipe connecting portions 132a, 132b, which connect to inner pipe 111. The main unit has a hollow inner cavity. This cavity is disposed continuously from the position where outer pipe connecting portion 131a and inner pipe connecting portion 132a are disposed to the position where the other outer pipe connecting portion 131b and inner pipe connecting portion 132b are disposed. Outer pipe connecting portions 131a, 131b comprise: a box nut 151; a bolt 152 on which threads are engraved for screwing into box nut 141; and a seal ring 153 tightening inside box nut 151 radially inward. Bolt 142 is screwed firmly to hollow connecting member 105a. Similarly, inner pipe connecting portions 132a, 132b comprise: a box nut 161; a bolt 162; and a seal ring 163. Bolt 162 is screwed firmly to hollow connecting member 105a.

Figure 10:
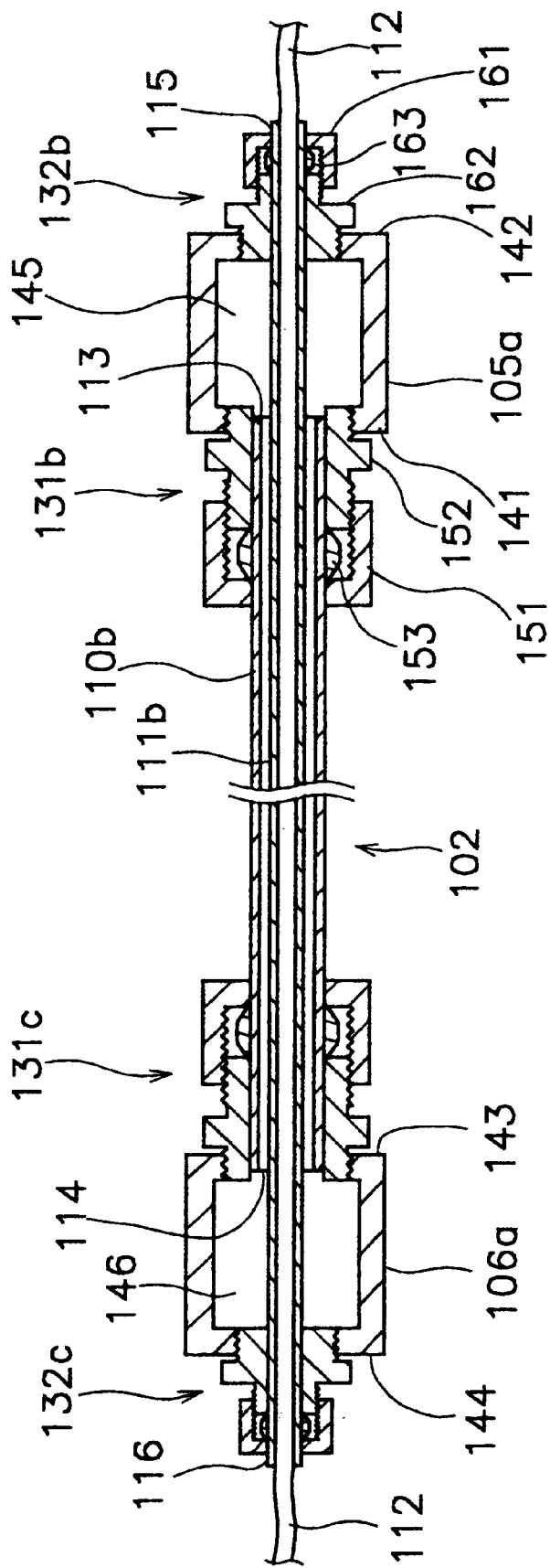
FIG. 10 is a cross-section drawing along the X—X line in FIG. 8.

Referring to FIG. 10, with hollow connecting portions 105a, 105b as described above, the following is a description of one end of double pipe structure 102 (to the right in the drawing). Outer pipe connecting portion 131b connects to one end of outer pipe 110b (to the right of the drawing) at side 141 of hollow connecting member 105a, and inner pipe 111b passes through outer pipe 110b and hollow cavity 145 of hollow connecting member 105a, connecting to inner pipe connecting member 132b at side 142. An end 113 of outer pipe 110b opens into hollow cavity 145 of hollow connecting member 105. Inner pipe 111b is connected so that an end 115 of inner pipe 111b opens outside of hollow connecting member 105a. At end 113 of outer pipe 110b, box nut 141 of outer pipe connecting portion 131b is screwed to bolt 152. Seal ring 153 is interposed between the projecting end of bolt 152 and the bottom surface of box nut 151. Both ends of the outer surface of seal ring 153 are tapered. Tightening box nut 151 results in a tight seal by seal ring 153 toward the surface of outer pipe 110b. This seal makes it possible to isolate hollow cavity 145 of hollow connecting member 105a from the outside. At end 115 of inner pipe 111b, box nut 161 of inner pipe connecting portion 132b is screwed to bolt 162. As described above, tightening box nut 161 results in a tight seal by seal ring 163 toward the surface of inner pipe 111b. This seal makes it possible to isolate hollow cavity 145 of hollow connecting member 105a from the outside. The above description also applies to the other end of double pipe structure 102 (to the left in the drawing). The other end of outer pipe 110b is connected to side 143 of hollow connecting member 106a, and the other end of inner pipe 111b is connected to side 144. End 114 of outer pipe 110b opens into hollow cavity 146 and end 116 of inner pipe 111b opens outside of hollow connecting member 106a.

Figure 11:
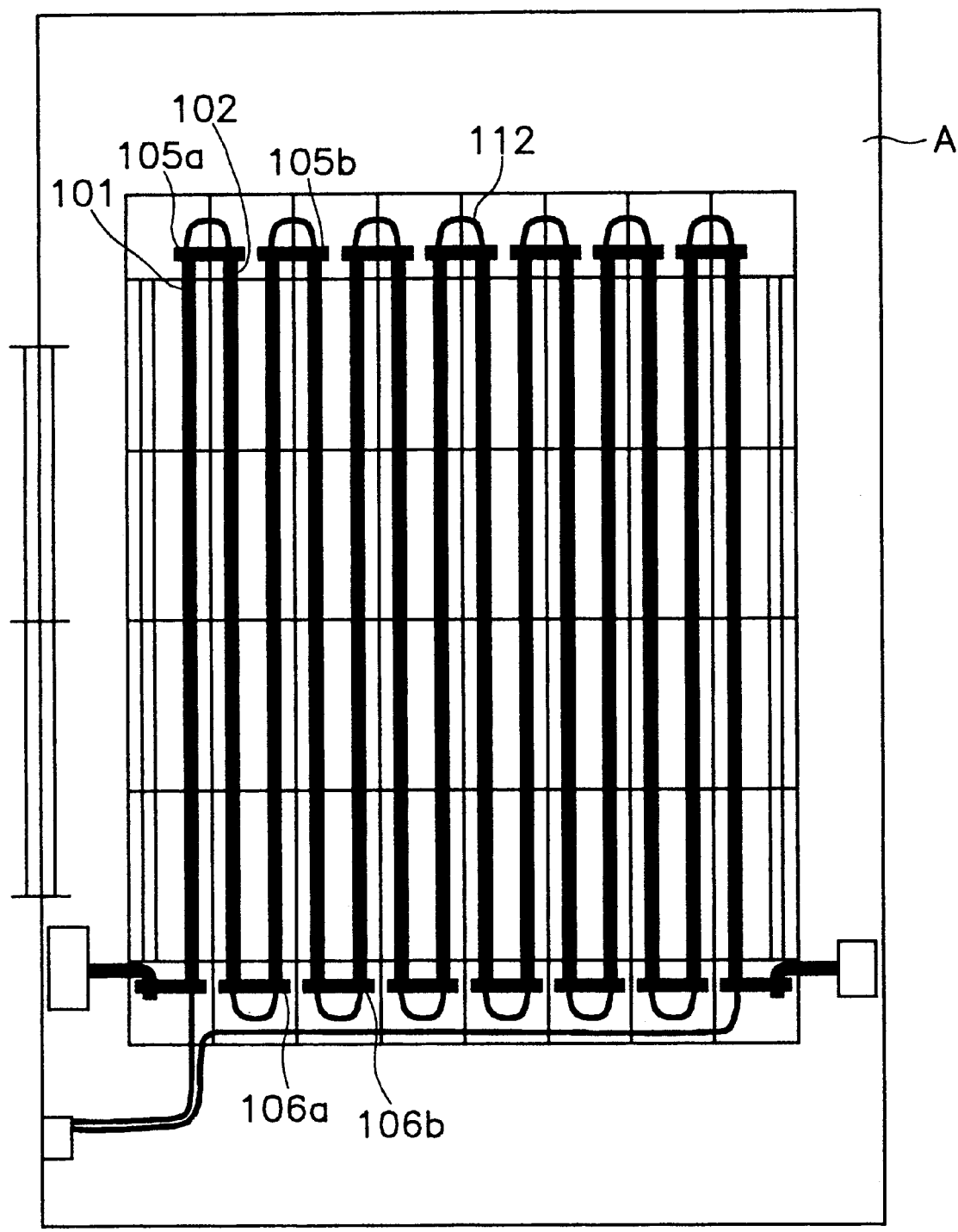
FIG. 11 is a drawing for the purpose of describing the entire room system.

Referring to FIG. 11, the following is a description of a floor heating system that uses hollow connecting members as described above. Double pipe structures 101, 102, . . . are disposed parallel to one another in room A where the floor heating system is to be installed. The ends of the pipes form 'interrupting' connections with hollow connecting members 105a, 105b, . . . , 106a, 106b. . . The manner in which the connections are made is as described above. Double pipe structures 101, 102, . . . are connected so that the space between the inner pipes and outer pipes are continuous and form a wave shape. Connections are made so that double pipe structure 101 in the first row is continuous with all the pipes up to the double pipe structure in the last row. Water (or a thermal medium fluid) is poured into the continuous space between the outer pipes and the inner pipes, and the water (or the thermal medium fluid) is sealed into this space. Electric heating wire 112 is passed through the inner pipes of double pipe structures 101, 102, . . . so that heat can be discharged over a prescribed region in room A. Electric heating wire 112 is passed through the space between the outer pipes and the inner pipes so that it matches the roughly wave shape of the space.

Figure 12:
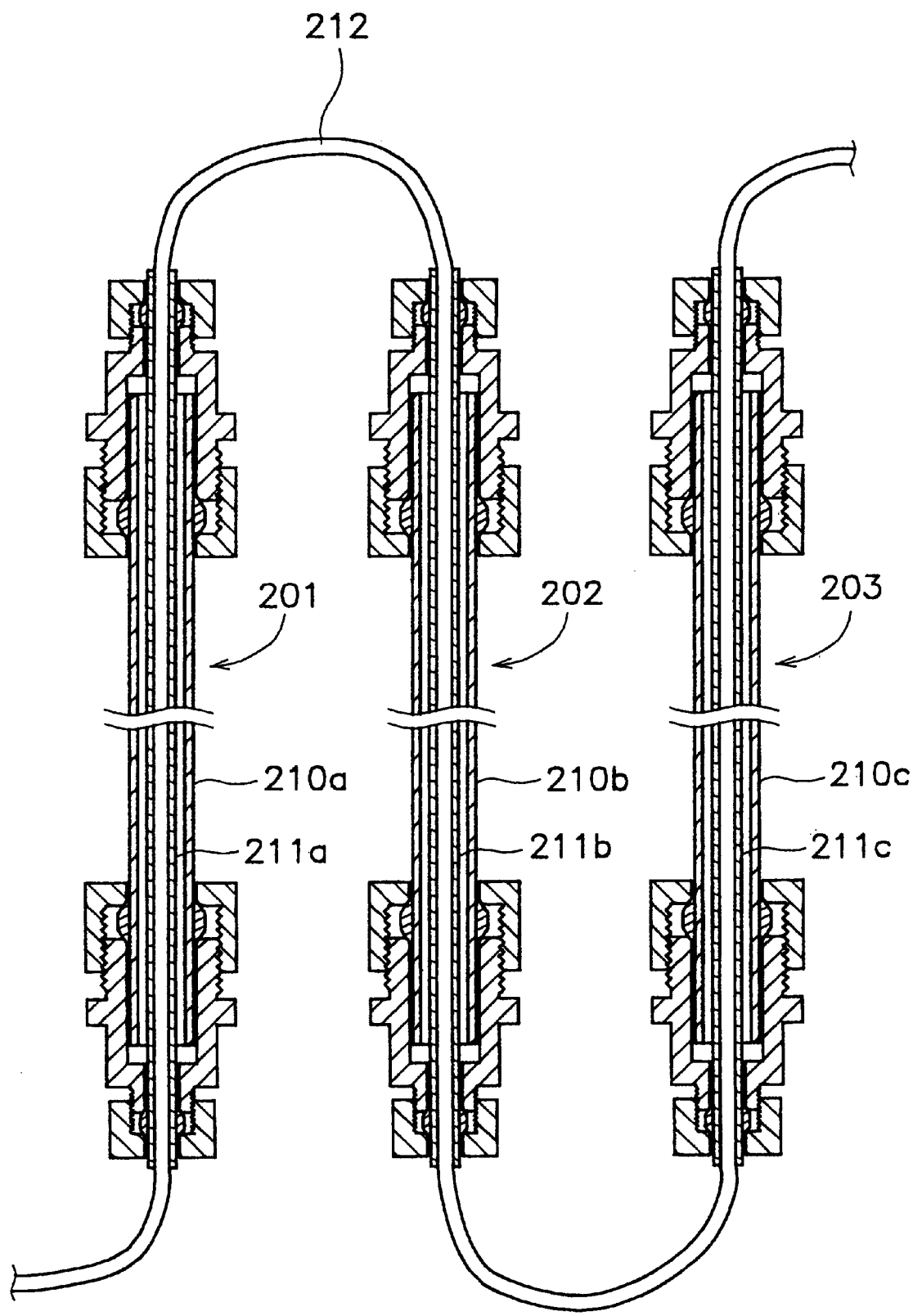
FIG. 12 is a drawing for the purpose of describing a third embodiment of the floor heating system of the present invention.

The following is a description of a floor heating system according to the third embodiment of the present invention. Referring to FIG. 12, in this embodiment double pipe structures 201, 202, 203, . . . are independent units. Inner pipes 211a, 211b, 211c are disposed so that they project from the ends of double pipe structures 201, 202, 203, . . . Outer pipes 210a, 210b, 210c, . . . and inner pipes 211a, 211b, 211c, . . . are tightly connected at both ends, and water (or a thermal medium fluid) is sealed in the space between the outer and inner pipes. The water (or thermal medium fluid) is sealed in by sealing one end of outer pipes 210a, 210b, 210c and inner pipes 211a, 211b, 211c while water is poured in from the other end. The plurality of double pipe structures 201, 202, 203, . . . prepared in this way is arranged in the area which is to be heated. Electric heating wire 212 is passed through inner pipes 211a, 211b, 211c. This completes the floor heating system of this embodiment. Since double pipe structures 201, 202, 203, . . . are separate units, there is no need to assemble anything at the floor heating construction site. Double pipe structures 201, 202, 203, . . . can be prepared beforehand and shipped to the construction site so that they can be arranged in the prescribed positions. This makes the operation quicker and more efficient. Since different lengths corresponding to different standard room sizes can be prepared, mass production can be performed to lower construction costs. Also, it is possible to check to see if double pipe structures 201, 202, 203, . . . show any water (or thermal medium fluid) leakage occurs through pinholes or the like. The connection at the ends of double pipe structures 201, 202, 203, . . . can be screw connections, but if pipes are constructed in factories it would also be possible to join the pipes by welding or the like.

Figure 13:
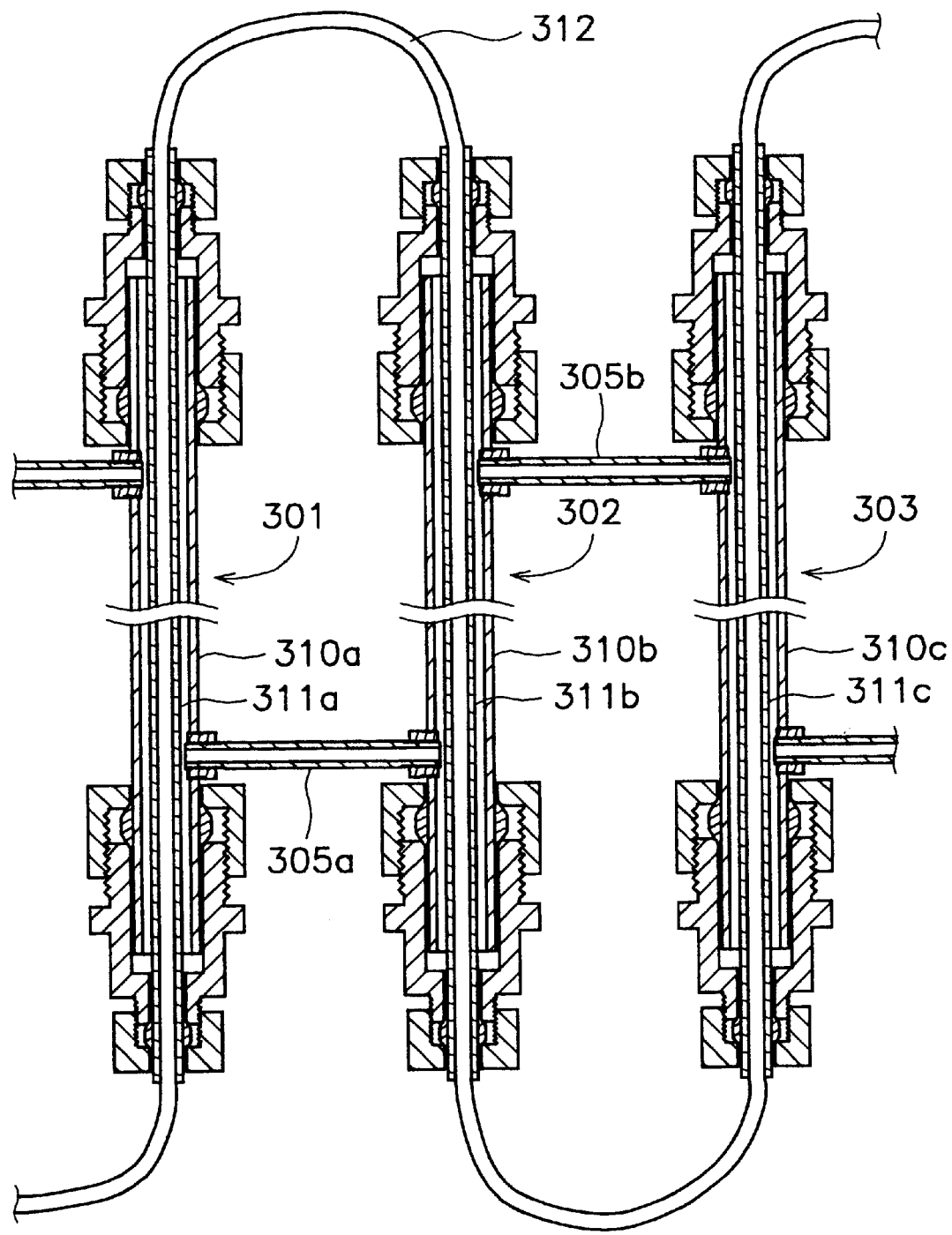
FIG. 13 is a drawing for the purpose of describing a fourth embodiment of the floor heating system of the present invention.
Figure 14:
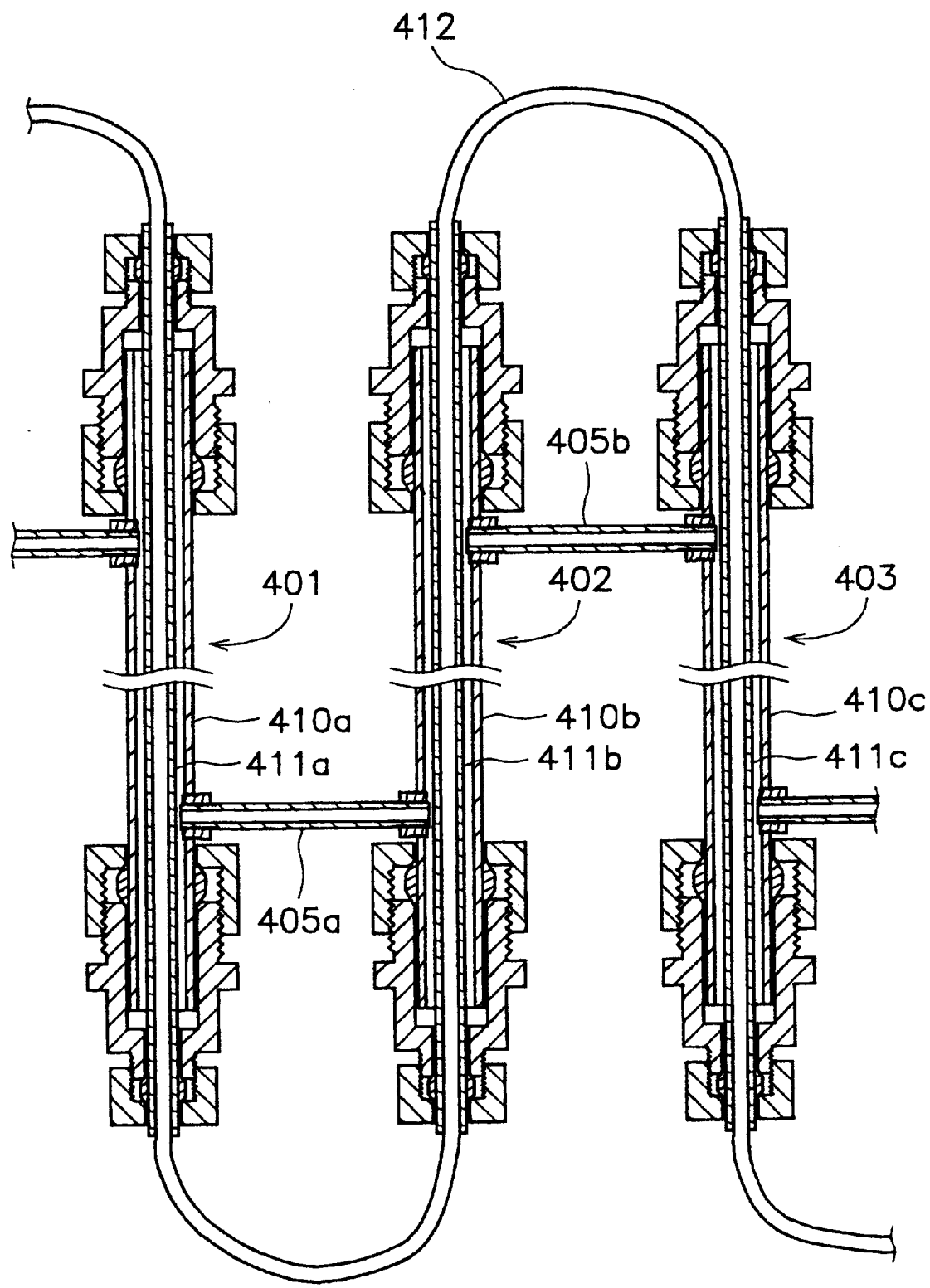
FIG. 14 is a drawing for the purpose of describing a fifth embodiment of the floor heating system of the present invention.

The following is a description of the fourth embodiment of the floor heating system of the present invention. Referring to FIG. 13, this embodiment is a slight variation of the third embodiment described above. Hollow connecting members 305a, 305b, 305c, . . . which are formed as hollow cylinders, are connected only to outer pipes 310a, 310b, 310c, . . . at the ends of double pipe structures 301, 302, 303, . . . Hollow connecting members 305a, 305b, 305c, . . . form 'interrupting' connections at the ends of double pipe structures 301, 302, 303, . . . so that one end (bottom of the drawing) and the other end (top of the drawing) of double pipe structures 301, 302, 303, . . . are connected in alternation. With this kind of connection, hollow connecting member 305a provides a continuous connection from the space between outer pipe 310a and inner pipe 311a of first-row double pipe structure 301 to the space between outer pipe 310b and inner pipe 311b of second-row double pipe structure 302. When water (or a thermal medium fluid) is poured into this space, it flows from first-row double pipe structure 301 to second-row double pipe structure 302. The spaces within double pipe structures 301, 302, 303, . . . form a continuous wave shape due to hollow connecting members 305a, 305b, 305c, . . . Thus, when water (or a thermal medium fluid) is poured in, the air within the pipes is pushed out in the direction of the flow. This makes it unlikely that air will remain in the pipe, and even if it did, the amount can be minimized. Thus, the water (or a thermal medium fluid) pushes out the air and is sealed within the pipe. Then, electric heating wire 312 is passed through inner pipes 311a, 311b, 311c, . . . of double pipe structures 301, 302, 303, . . . Referring to FIG. 13, electric heating wire 312 is passed through the continuous wave shape formed by the spaces within double pipe structures 301, 302, 303, . . . and hollow connecting members 305a, 305b, 305c, . . . Electric heating wire 312 can be passed through the double pipe structures without regard to the wave shape, or it can be passed through the pipe structures so that it follows the wave shape. Referring to FIG. 14, it is also possible to bend an electric heating wire 412 in an arcuate shape on the sides of double pipe structures 401, 402, 403, . . . which are connected to hollow connecting members 405a, 405b, 405c, . . . Thus, electric heating wire 412 can be installed in a wave shape that matches the continuous wave shape formed by double pipe structures 401, 402, 403, . . . and hollow connecting members 405a, 405b, 405c, . . . Thus, when it is necessary to inspect or repair double pipe structure 401, 402, 403, . . . , hollow connecting members 405a, 405b, 405c, . . . or electric heating wire 412, only the floor around hollow connecting members 405a, 405b, 405c, . . . needs to be removed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, double pipe structures 1, 2, . . . and main pipes 5, 6 were described above as being cylindrical in shape. This is a representative and commonly used shape, but different shapes can be used to accommodate factors in construction and the like. In the description of the embodiments, it was stated that water is sealed in outer pipe 10, but the present invention is not restricted to water, and covers the use of thermal medium fluids such as ethylene glycol-based solvents. Furthermore, in certain cases it is possible to seal other materials that can act as thermal mediums as well. In the embodiments described above, the descriptions centered around double pipe structures that comprised cylindrical pipes. These pipes can be copper pipes having good heat conduction, but can also be metal pipes, such as stainless steel or flexible pipes. Polyethylene pipes can be used as well. The material can be modified in accordance with factors such as the place to be heated, the length of time heating is to be performed, and the like, and the pipe can also comprise materials other than the examples given above.

Figure 15:
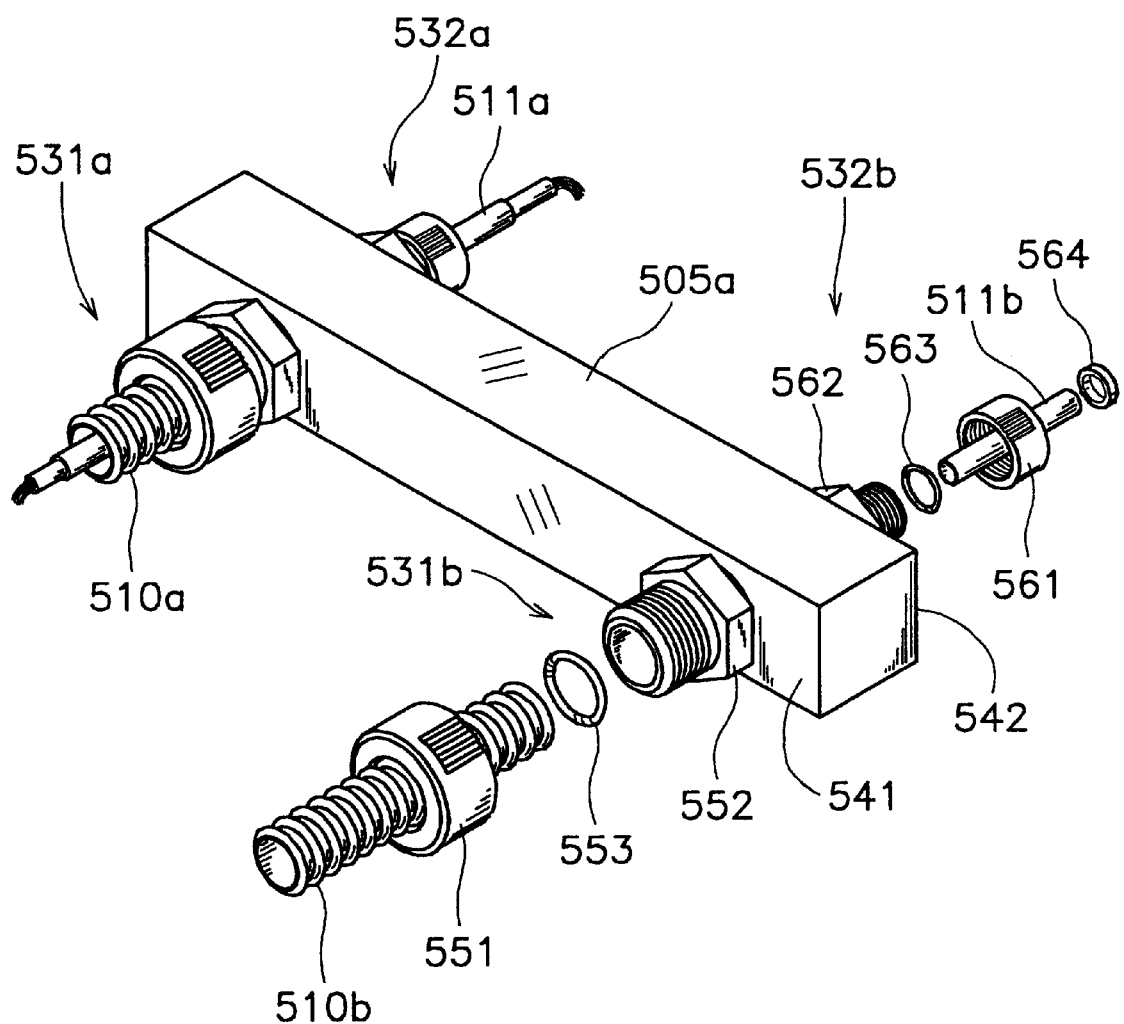
FIG. 15 is a drawing for the purpose of describing a modified hollow connecting member.

In hollow connecting members 105, 106 described above, the structures of outer pipe connecting portion 131 and inner pipe connecting portion 132 are not restricted to the structures indicated above. Referring to FIG. 15, for example, it is also possible to have an outer pipe connecting portion 531 and an inner pipe connecting portion 532 as shown. In this case, flexible piping is used for outer pipes 510*a*, 510*b*. A rubber seal ring 553 is fitted in a cavity in outer pipe (510*a*) 510*b*. A box nut 551 is screwed into a bolt 552 so that seal ring 553 is interposed. This provides a tight seal between outer pipe (510*a*) 510*b* and box nut 551. Similarly, a seal ring 563 is interposed between inner pipe (510*a*) 510*b* and box nut 561 to provide a tight seal. However, since flexible piping is not used for inner pipe (511*a*) 511*b*, motion along the direction of the axis line is possible. Therefore, a stopper 564 is adhered to the outside of box nut 561 on the surface of inner pipe (511*a*) 511*b*. A similar stopper (not shown in the drawing) is adhered to the end on the opposite side of inner pipe (511*a*) 511*b*. These two stoppers act to prevent motion along the axis line in either direction.

As described above, in the floor heating system of the present invention a double pipe structure comprising an outer pipe and an inner pipe is disposed under a floor. Water or a thermal medium fluid is sealed in the double pipe structure between the outer pipe and the inner pipe. A heat generating body is inserted inside the inner pipe. By heating the water or the thermal medium fluid between the inner pipe and the outer pipe, it is possible to discharge the heat accumulated within the outer pipe so that even if the amount of heat generated by the heat generating body is low, it is possible to provide adequate heating.

The floor heating system of the present invention is achieved with a floor heating device comprising: two main pipes disposed parallel to each other; outer pipes connected to facing sides of the two main pipes; inner pipes within the outer pipes that connect to the non-opposing sides of the two main pipes; and a heat generating body inserted within the inner pipes. Since the inner pipe is hollow, an appropriate heat generating body such as an electric heating wire can be inserted. Since there is a space between the inner side of the outer pipe and the outer side of the inner pipe, and since this space is continuous with the hollow space in the main pipes, water or thermal medium fluid poured into the main pipes can be sealed in the space between the inner side of the outer pipe and the outer side of the inner pipe. The heat discharged by the heat generating body can be adequately transferred to the inner pipe. This heat heats the inner pipe, which heats the water or thermal medium fluid sealed in the outer pipe, i.e. disposed so that it covers the outside of the inner pipe. Furthermore, the high-temperature water or thermal medium fluid raises the temperature of the outer pipe, and this temperature is transferred from the outer pipe to the floor surface. In general, the heat from a electric heating wire can be limited by very slight air currents. By inserting the electric heating wire into an inner pipe surrounded by water or a thermal medium fluid, the flow of heat into the periphery is prevented, and the water or the thermal medium fluid serves to stabilize the temperature.

The present invention also relates to a floor heating system wherein: a plurality of double pipe structures comprising an outer pipe and an inner pipe is disposed under a floor so that they are parallel to each other; water or a thermal medium fluid is sealed between the outer pipe and the inner pipe; and a heat generating body is passed through the space within the inner pipe. In this floor heating system, the inner pipes are projected from both ends of each of the double pipe structures, and a heat generating body is passed through the space within the inner pipe. Each of the double pipe structures is configured independently so there does not need to be a process for pouring water or a thermal medium fluid into the pipes, and there is minimal residual air in the pipes. The outer pipes and the inner pipes at the ends of the double pipe structures can be connected without requiring assembly of the double pipe structures at the construction site. This makes installation easier, and provides lower production costs since the double pipe structures can be produced in a plant. This makes it possible for the overall price of the floor heating system to be reduced.

If an electric heating wire is used as the heat generating body described above, it is possible to start and stop heating by operating the power supply switch, and there is no need to worry about leaks of the thermal medium fluid or the like. Thus, operation is simplified.

The present invention also relates to a hollow connecting member used in a floor heating device. The floor heating device comprises a plurality of outer pipes disposed parallel to each other under a floor; inner pipes disposed within the outer pipes; and an electric heating wire inserted in the inner pipes. The member comprises: an outer pipe connecting portion that can connect with two adjacent outer pipes on the same side; an inner pipe connecting portion that can connect with the inner pipe along an extension of the axial line of the outer pipe; and a hollow cavity that is continuous with the outer pipe and the inner pipe. The outer pipe of the double pipe structure is connected with the outer pipe connecting portion, and the inner pipe is connected with the inner pipe connecting portion which lies along an extension of the axial line of the outer pipe. Thus, the inner pipe can be projected outward without having it open within the outer pipe. The hollow cavity that is continuous with the outer pipe and the inner pipe provides a continuous space between the two.

If the outer pipe connecting portion and the inner pipe connecting portion can be connected with screws, then the connecting operation is simplified. If a rubber ring is interposed between the inner pipe connecting portion and the inner pipe, then the water or the thermal medium fluid sealed between the outer pipe and the inner pipe can be completely sealed off from the outside.

What is claimed is:

1. A floor heating system comprising:

a plurality of double pipe structures each including outer pipes and inner pipes disposed parallel to each other under a floor so that heat emitted through said outer pipes can heat the floor, said double pipe structures extending between and being connected at opposite structure ends to a pair of parallel main pipes;

one of water and a thermal medium fluid is sealed in said double pipe structures between said outer pipes and said inner pipes; and a heat generating body;

said heat generating body being inserted within each said inner pipe through openings at inner pipe ends which are projected from ends of said double pipe structures beyond said outer pipes.

2. A floor heating system in accordance with claim 1 wherein:

said heat generating body includes a continuous electric heating wire inserted within said inner pipes;

projecting ends of said inner pipes of said double pipe structures passing through said main pipes;

said electric heating wire is passed through a first-row double pipe structure from an inner pipe first end to a second inner pipe end;

said electric heating wire is passed through an adjacent second-row double pipe structure from a second end of its inner pipe to the said inner pipe first end;

said electric heating wire is passed through an adjacent third-row double pipe structure from a first end of its inner pipe to the second end of said third row double pipe; and this process is repeated until said electric heating wire is passed through a double pipe structure disposed as a last row of such.

* * * * *